Aug. 29, 1961  E. L. MOYER  2,998,282
FORGED WHEEL CONSTRUCTIONS AND PROCESS OF MAKING SAME
Filed Nov. 23, 1956  10 Sheets-Sheet 8

Fig.8.

INVENTOR.
EDWARD L. MOYER.
BY John A. Young
ATTORNEY

INVENTOR.
EDWARD L. MOYER.
BY John A. Young
ATTORNEY.

United States Patent Office 2,998,282
Patented Aug. 29, 1961

2,998,282
FORGED WHEEL CONSTRUCTIONS AND PROCESS OF MAKING SAME
Edward L. Moyer, South Bend, Ind., assignor to The Bendix Corporation, a corporation of Delaware
Filed Nov. 23, 1956, Ser. No. 624,161
1 Claim. (Cl. 301—6)

This invention relates to forged wheel constructions for aircraft landing gear assemblies and the process of making the forged wheel constructions.

The aircraft wheel and brake art has developed principally around cast constructions. It is an object of the present invention to replace cast constructions with forged wheel constructions since forgings provide greater strength properties for a given weight and also because forged constructions provide more easily analyzed constructions from the standpoint of stress analysis. In the aircraft wheel and brake art, it is desired that the wheel constructions attain performance requirements with a minimum weight. If the structure does not lend itself to stress analysis, the manufacturer must of necessity, work largely by guess work and increase the safety factor in order to insure adequate performance. This was a common shortcoming of the cast wheel construction in which there were complicated cores and webs which precluded any refined degree of stress analysis.

With the present invention, I propose a wheel construction which is simplified to an extent permitting precise force analysis so that the wheel construction can be provided with a predictable strength to thereby achieve minimum weight.

It is an object of the invention to provide a wheel construction which will lend itself to a forging type process of manufacture without introducing the problem of "cross grain flow," a condition tending to weaken forged constructions.

It is a further object of the invention to provide a wheel construction which is held rigidly against collapse when side loads are imposed on the wheel construction, and to accomplish this by means of an interlocking portion of two forged wheel sections.

It is a further object of the invention to finish the forged wheel by a machining operation, and simultaneously, by the same machining operation, to provide a plurality of ventilating openings in the wheel discs so that there is provided ventilation through the wheel.

Other objects and features of the invention will become apparent from a consideration of the following description which proceeds with reference to the accompanying drawings wherein a plurality of embodiments of the invention are illustrated by way of example.

Figure 1:
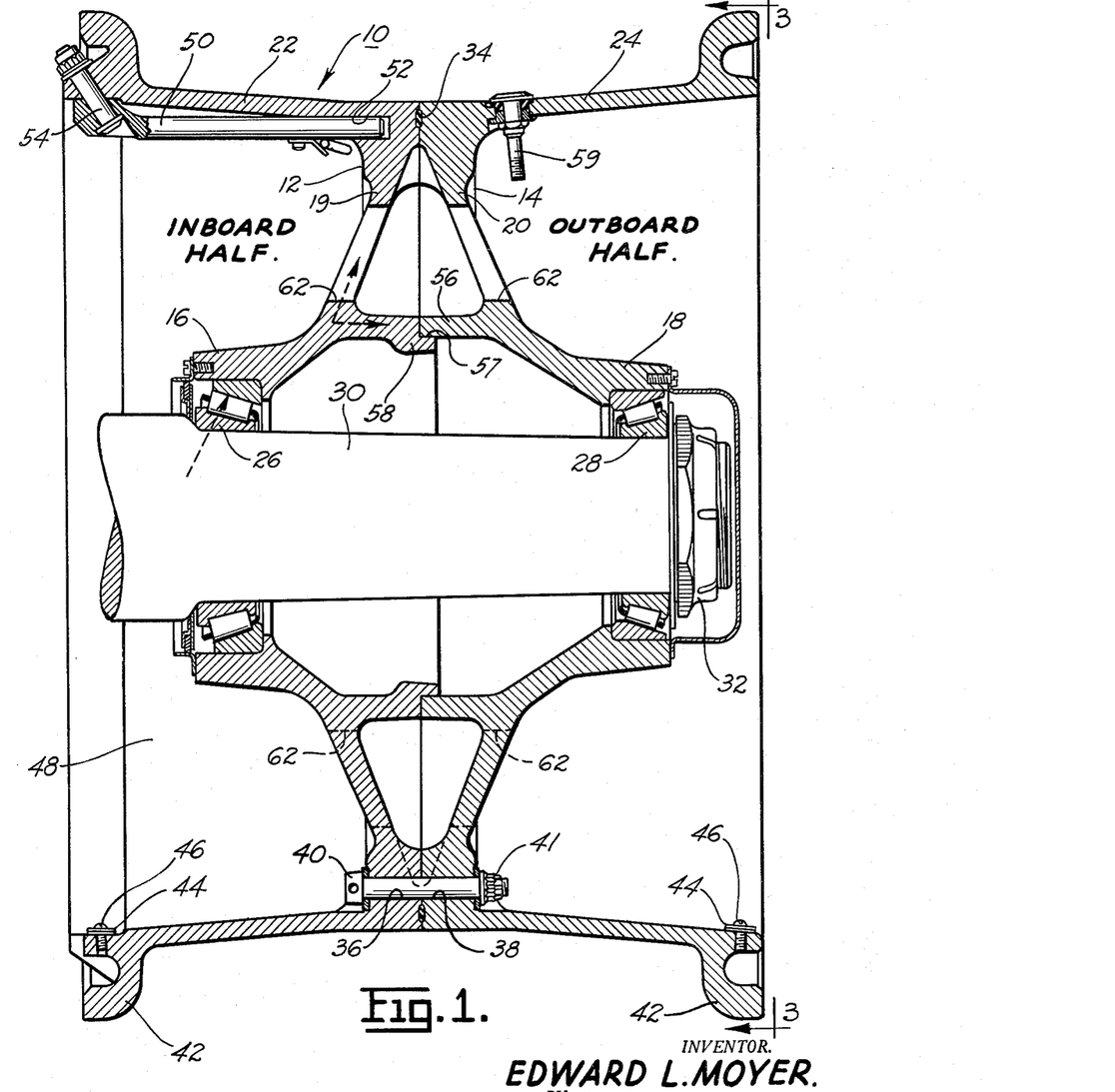
FIGURE 1 is an axial cross-section view of a forged wheel construction.
Figure 2:
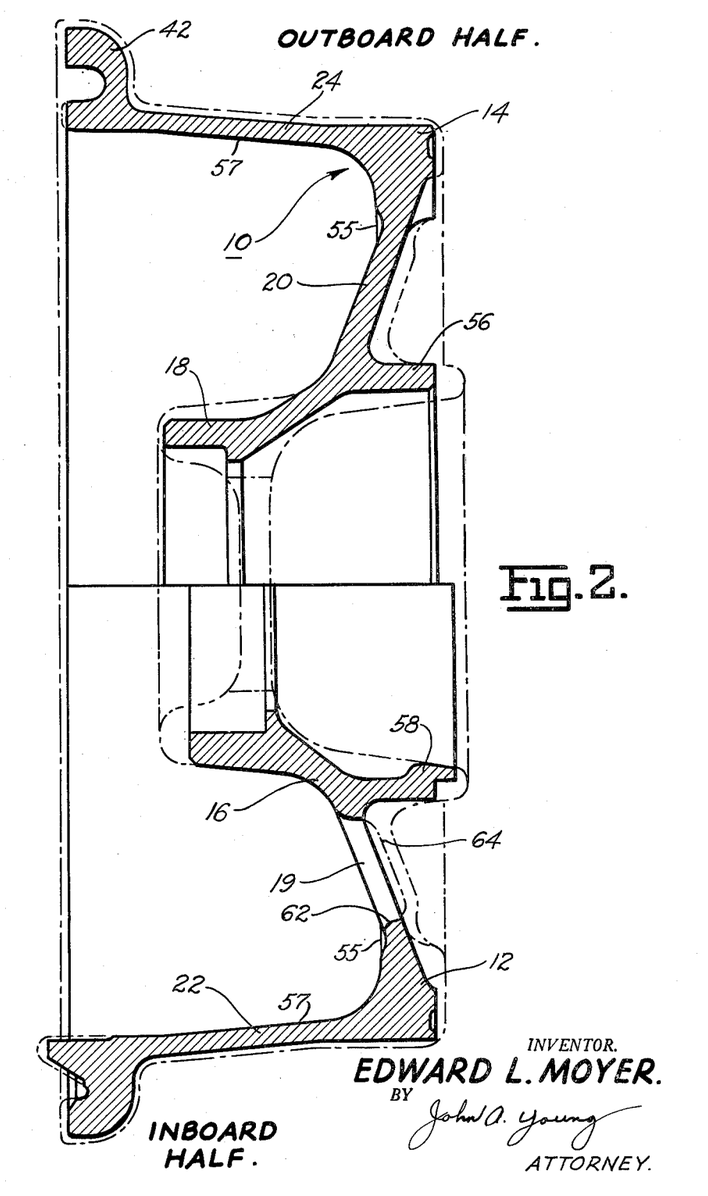
FIGURE 2 shows in dot-dash line (above the centerline) the outline of the forging for the outboard half of the wheel illustrated in FIGURE 1, the solid line is the finished profile of the outboard wheel half; and, below the centerline in FIGURE 2 the inboard wheel forging is indicated in dot-dash, and the solid line is the profile of the finished inboard wheel half.
Figure 3:
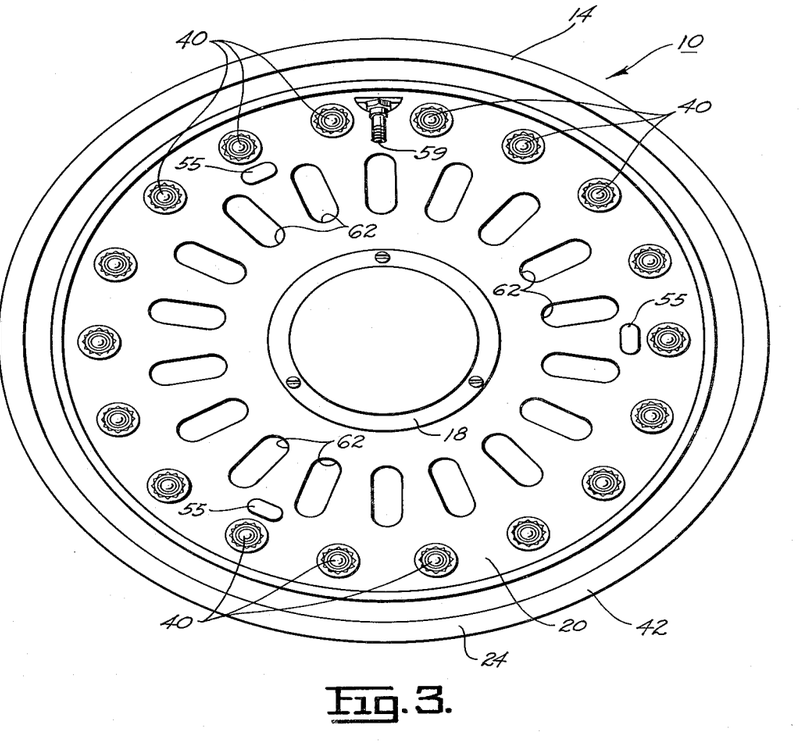
FIGURE 3 is an elevation view of the wheel shown in FIGURE 1, looking in the direction of the arrows 3—3 in FIGURE 1.

Referring first to the embodiment shown in FIGURES 1 to 3, the aircraft wheel is designated generally by reference numeral 10. The wheel is made up of an inboard half 12 and an outboard half 14. Wheel halves 12 and 14 are provided with hub portions 16 and 18, disc wheels 19 and 20, which are constructed integrally with the hubs 16 and 18, and transverse rim portions 22 and 24 which are formed integrally with disc wheels 19 and 20.

Hub portions 16 and 18 are mounted on tapered roller bearing assemblies 26 and 28. The tapered roller bearings are fitted onto a stationary axle 30. The hubs 16 are tapered so that when they are fitted over the roller bearing assembly, the hubs will exert a uniform pressure thereon to prevent binding of the races against the tapered rollers of the bearing. A hub nut 32 is used to retain the bearings and wheel on the axle 30. The disc wheels 19 and 20 are conically shaped and are fitted together radially outward from the center of the wheel. Where the disc wheels are joined together, a recess may be provided with a seal 34 positioned therein.

Matched openings 36 and 38 are formed in the abutting portions of disc wheels 19 and 20 and bolts 40 are passed through the matched openings of wheel discs to secure the two wheel halves together.

Each of the rims 22 and 24 has an annular shoulder 42 at the opposite sides of the wheel to provide a tire well which serves as the mounting for the tire. Shoulders 42 support the sides of the tire.

The wheel may be balanced by means of weights 44 which are attached by screws 46 to the inboard and outboard flanges 42. The rim 22 of the inboard wheel half extends around the brake cavity 48 wherein a disc brake is received. The brake is removed to better illustrate the wheel.

Drive keys 50 are carried by the inboard wheel half 12. One end of the rotor drive key is fitted into an opening 52 in disc wheel 19 and the other end of the drive key is fastened by a bolt 54 to the flange 42.

The outboard wheel half is machined from a forging which is originally shaped according to the dot-dash line in the upper portion of FIGURE 2. This forging is the same used for the inboard and the outboard half. The forging is purchased in the shape indicated by the dot-dash line and not as a rectangular or square billet. The forging is generally sold by the pound and the weight saving represented can be a substantial cost saving.

The forging is profiled by a machining operation to obtain the configuration outline by the solid lines. To locate the forging properly during machining there are provided three tooling pads 55 which consist of raised bosses on the disk wheel. The pads determine the plane in which wheel half is located during machining. Referring to FIGURE 2, the chuck jaws of the machine are brought into engagement with the undersurface 57 of the rim 24 to locate the forging in a radial sense, and the machine setting includes the other factors of forging location necessary to cut the finished article out of the forging.

Note that the hub 18, disc wheel 20, and rim 24 are formed integrally in making the outboard wheel half. The same is true of the inboard wheel half. The outboard wheel half 14 (FIGURE 1 and upper half of FIGURE 2) has a cylindrical extension 56 formed integrally with the disc wheel 20. The cylindrical extension 56 is interlocked with the stepped portion 57 of the cylindrical extension 58 on disc wheel 19 of the inboard wheel half.

The interlocking extensions 56 and 58 serve to rigidify the wheel and prevent collapse of the wheel during side loading thereof. When the wheel is subjected to uneven forces at the sides thereof the disc wheels 19 and 20 of the wheel halves tend to move one with respect to the other in a radial sense. The interlocked cylindrical extensions 56 and 58 have a shear load imposed thereon. The shear resistance of a cylindrical member is considerable owing to its inherent design. It is thus possible by appropriate structure to resist internal wheel forces by providing an optimum configuration rather than merely making the disc wheels larger in order to provide the necessary wheel strength.

The disc wheels are conically shaped since this structure has been found to possess a substantial resistance to bending under the radial loads transmitted radially through the tire and thence to the disc wheels and finally to the bearings 26 and 28. The bearing reaction force, indicated by the dotted line in FIGURE 1 is divided between the two wheel halves, through the interlocking extensions 56 and 58. Thus loading of the wheel is distributed evenly between the wheel halves to minimize distortion on any one portion of the wheel.

With reference to FIGURE 2, pockets 64 are formed in each of the disc wheel forgings 19 and 20. These pockets are spaced around the circumference of the disc wheel and the purpose of their formation is to facilitate the construction of ventilating windows 62 in the disc wheels. The windows permit circulation of air through the wheel. When the side of the disc wheel is machined, the sockets 64 are removed entirely thus leaving an aperture 62 in the place of the removed pocket. This method of providing windows is convenient since simultaneously with the profiling the disc wheel, the ventilating windows are formed at no added expense or further processing step. The pockets are relatively easy to provide by forging methods. This process of forming the ventilating openings has proved very successful and has been employed in actual production techniques for the fabrication of aircraft wheels in large quantities.

When assembling the wheel, the inboard and outboard wheel halves are placed back to back and rotated one with respect to the other until the openings 36 and 38 in disc wheels 19 and 20 are matched. The bolts 40 are then passed through the matched openings 36 and 38 and the wheel halves are permanently secured together by locked nuts 41.

An air valve 59 is fitted onto the rim 24 of wheel half 14. The valve shown is used for tubeless tires. The valve construction forms no part of the present invention, but does illustrate how the wheel construction may be adapted for this type of tire.

Referring next to the embodiment shown in FIGURES 4 through 10, parts of the wheel assembly corresponding to those previously described will receive the same reference numeral with the subscript "a."

Figure 4:
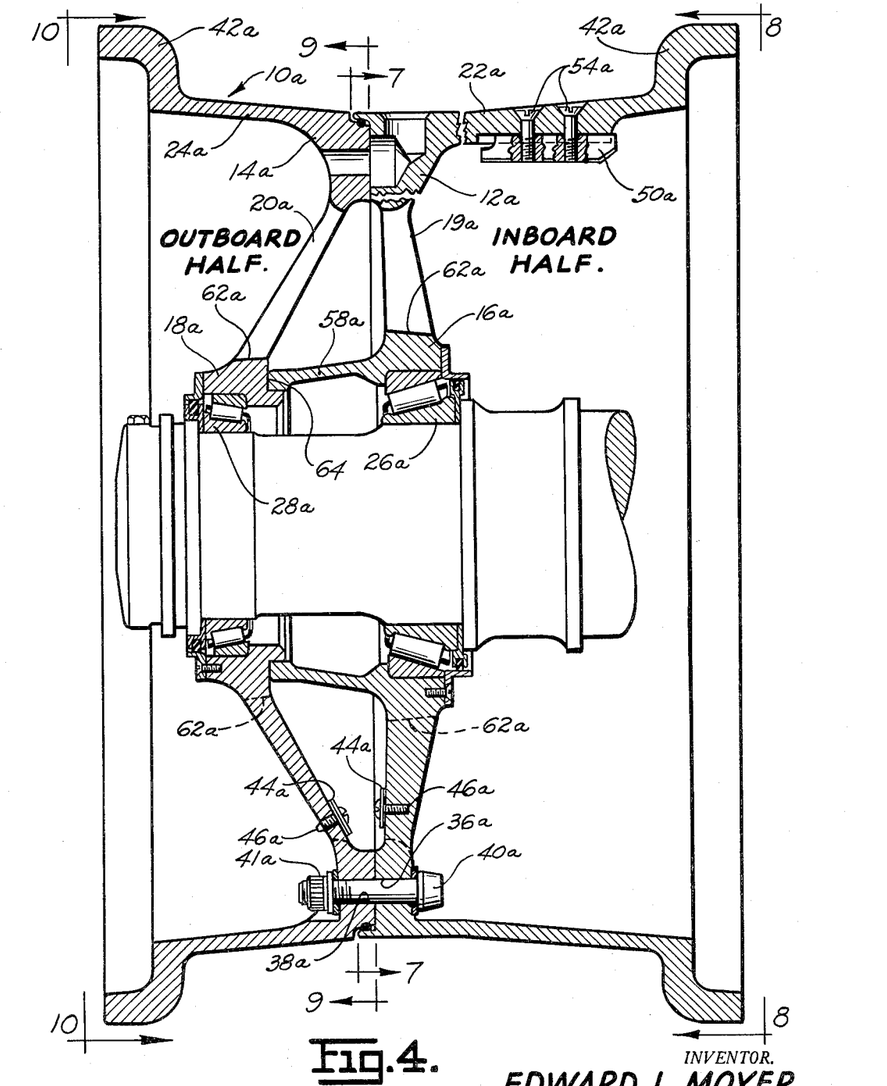
FIGURE 4 is an axial cross-section view of a second embodiment of the invention.

The wheel 10a comprises an inboard wheel half 12a and an outboard wheel half 14a. Outboard wheel half 14a comprises a hub portion 18a, a disc wheel 20a and a rim 24a provided with a tire supporting flange 42a. The inboard wheel half 12a comprises a hub portion 16a, disc wheel 19a and rim 22a having flange 42a which serves to support the side of the tire (not shown). The disc wheels 19a and 20a extend into abutting engagement radially outward from the center of the wheel and have aligned openings 36a and 38a formed therein to receive threaded bolts 40a having nuts 41a which secure the wheel halves together. Ventilating openings 62a are formed in the disc wheels to permit circulation of air through the wheel. The disc wheel 19a on the inboard half is substantially flat and is mounted on a tapered roller bearing 26a which is larger than the outboard tapered roller bearing 28a; the reason for the increased size of the roller bearing 26a is that a larger amount of vertical load is supported by this member than the outboard roller being assembly 28a.

Figure 5:
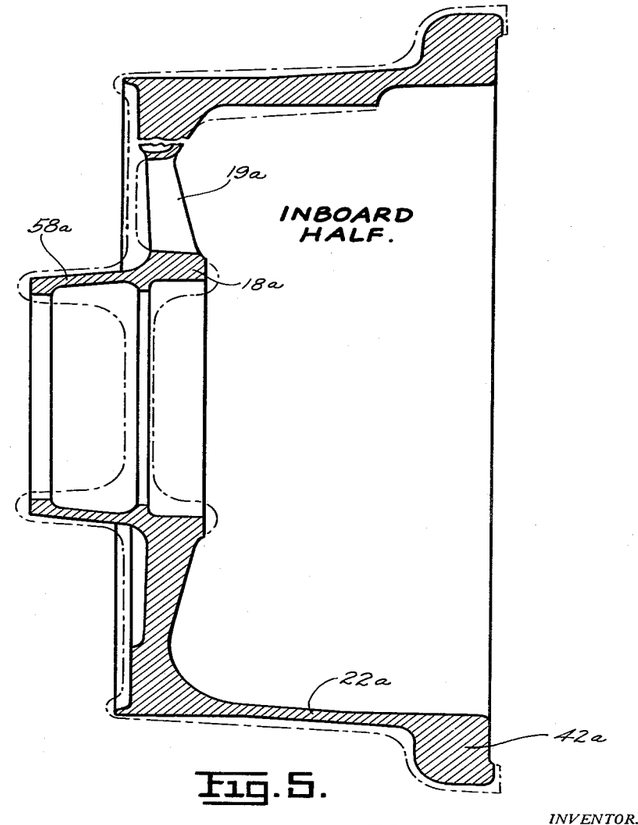
FIGURE 5 is a detail view of the inboard wheel half shown in FIGURE 4, the dot-dash lines being the outline of the forging, and the solid line being the machine-finished profile.
Figure 6:
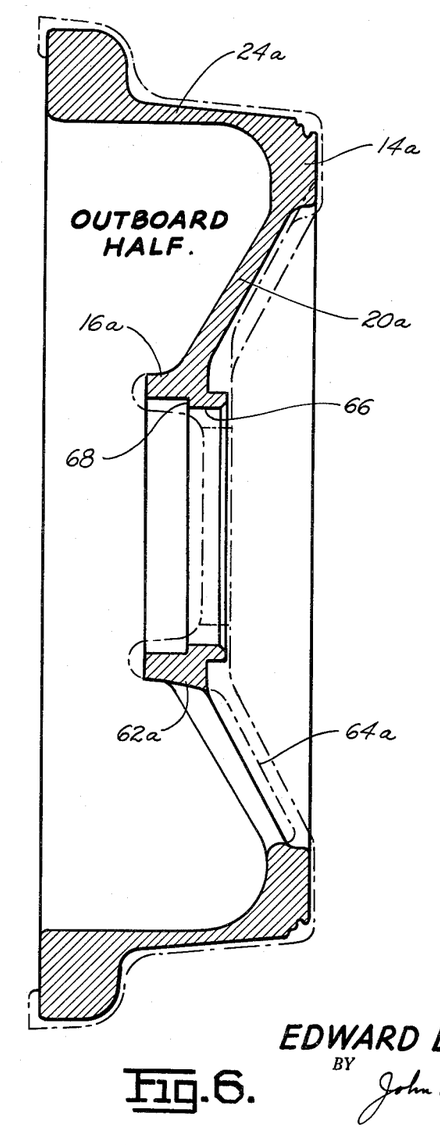
FIGURE 6 is a detail view of the outboard wheel half with the original forging dimensions indicated by the dot-dash line and the solid line indicating the machine-finished profile.

The openings 62a may be formed by drawing a portion of a wheel disc outwardly from the plane of the wheel disc during the forging operation to form a series of pockets 64a. Referring to FIGURES 5 and 6, it will be noted that during machining of the forging, the material comprising the pocket is removed to thereby form the ventilating opening 62a. This method of machining the inboard wheel half and outboard wheel half to its finished dimensions is economical and efficient. The magnesium forging lends itself to this processing and it is possible to form the wheel halves in large quantities.

Unlike the previous embodiment, the outboard half and inboard half are not made from the same initial forging. The outboard half forging is indicated by the dot-dash lines in FIGURE 6 and the inboard forging is indicated by the dot-dash lines in FIGURE 5.

To rigidify the wheel so that it will resist side loading, a cylindrical extension 58a is formed on the hub 16a of the inboard wheel half, and this extension is interlocked with a stepped portion 64 of the outboard hub 18a. To balance the wheel weights 44a are secured by screws or the like 46a to the outboard and inboard disc wheels 19a and 20a.

The inboard wheel half rim 22a surrounds the brake cavity. The brake members are shown removed to better illustrate the wheel. A plurality of rotor drive keys 50a are secured by screws 54a to the under surface of the rim 22a. It will be noted in FIGURE 5 that the disc wheel 19a is substantially flat. The disc wheel 19a is located approximately midway between the sides of the wheel.

The generally flat construction of the disc wheel 19a makes it less stiff than the conically shaped outboard wheel disc 20a. To prevent buckling of the wheel disc I provide for greater thickness of this member. The stiffness of a member is generally a function of the square of its thickness. Another means for stiffening the disc wheel 19a is the reinforcement 58a. If the disc wheel 19a should twist from its planar shape, the extension 58a is placed under a shear load. The cylindrical construction of the reinforcement extension 58a provides considerable shear resistance and this factor in turn imparts a stiffening to the disc wheel 19a sufficient so that the major part of the wheel load can be carried through the disc wheel 19a whether the load is a vertical load or a side load. It will be noted that the roller bearing 26a is larger than the outboard bearing 28a because a greater amount of wheel load is supported by the inboard disc wheel 19a.

Referring next to the outboard wheel half shown in FIGURE 6, it will be noted from the general outline of the forging indicated in dot-dash lines, that the forging approximately resembles the final dimensions of the outboard half, indicated in solid lines. The rim 24a is machined by removing material from the outer portion thereof so that a generally smooth contour is obtained on the surface which will accommodate the tire and be free of any sharp cutting edges. Pockets 64a are formed in the wheel disc 20a so that during machining operation, with removal of the pockets, there are formed ventilating openings 62a. This feature of forming windows in the wheel disc by a simple machining operation constitutes an important part of the invention. By following this process, it is possible to manufacture wheels in large quantities at a low cost of operation.

Figure 7:
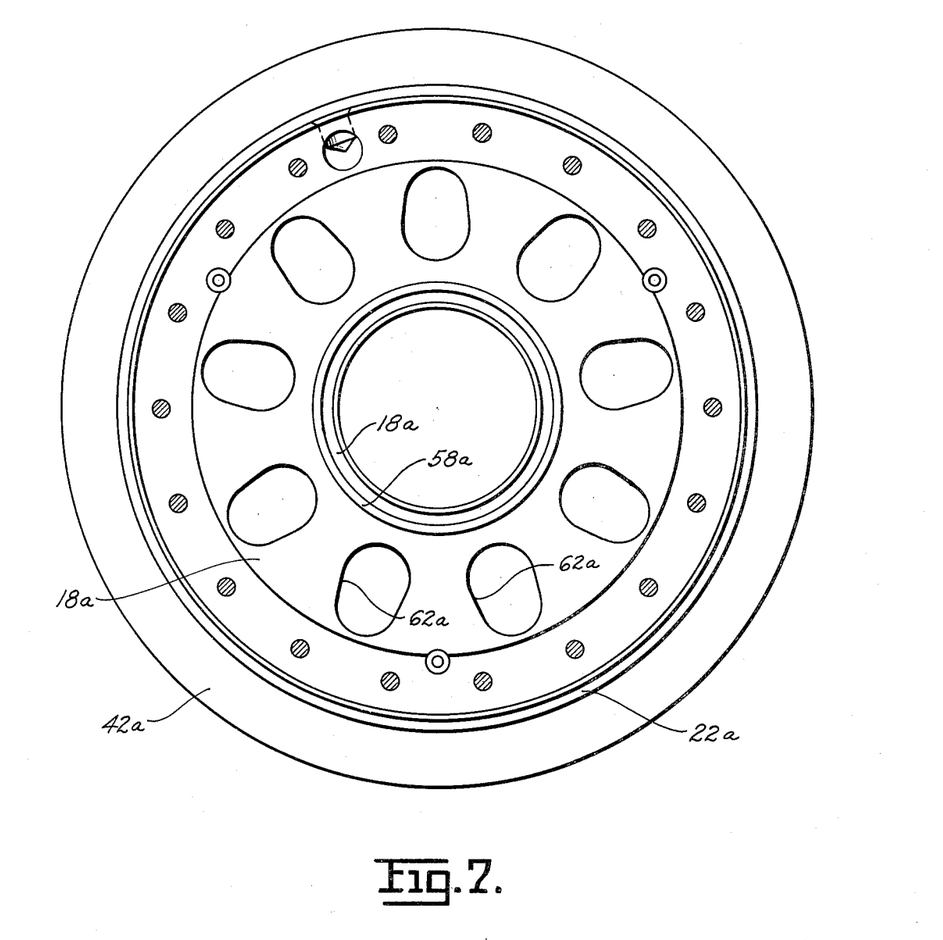
FIGURES 7 and 8 show front and rear elevation of the inboard wheel half, looking in the direction indicated by the arrows 7—7 and 8—8 in FIGURE 4.
Figure 8:
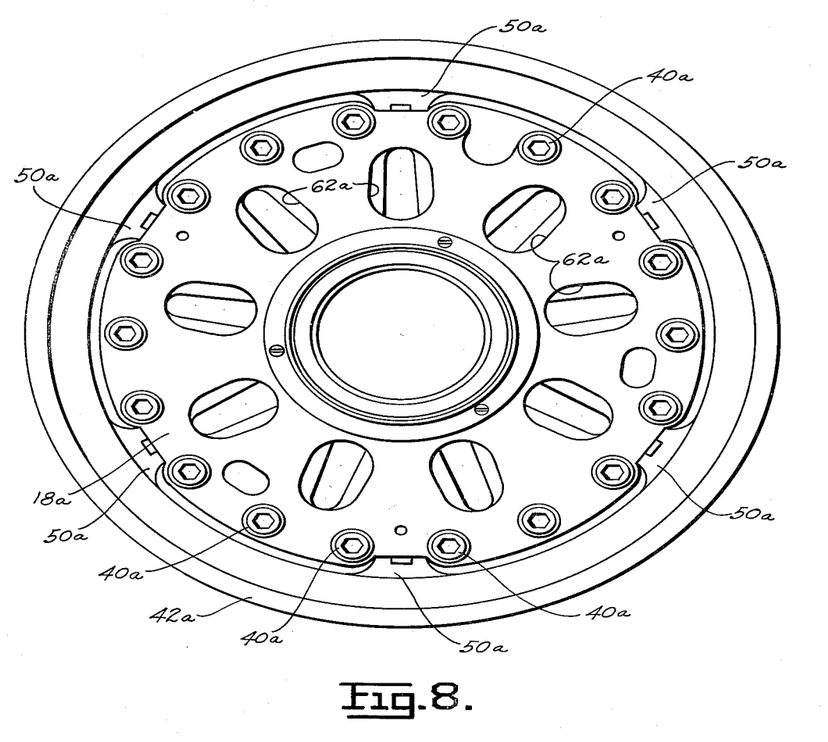
Figure 9:
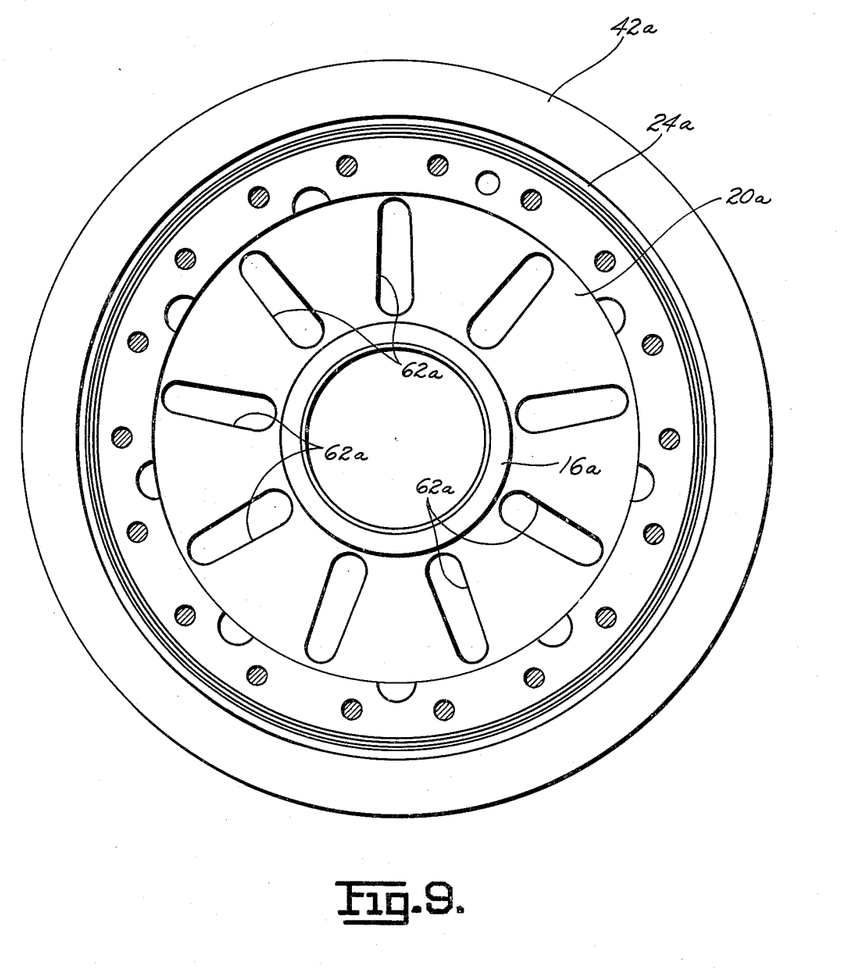
FIGURES 9 and 10 are front and rear elevation view of the outboard wheel half, looking in the direction of the arrows 9—9 and 10—10 in FIGURE 4.
Figure 10:
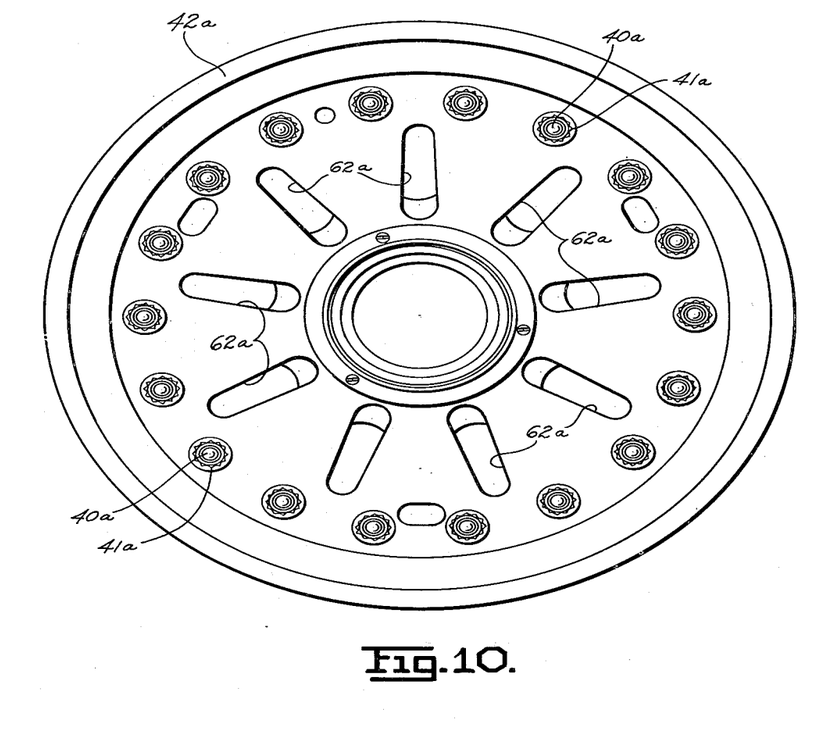

A central part of the disc wheel has formed therein an opening 66. The purpose of forming the opening is so that the wheel half 14a can be fitted over the stationary axle. Shoulder 68 is provided at the hub 16a and the outboard tapered roller bearing 28a is fitted against shoulder 68. FIGURES 7 and 8 show the ventilating openings 62a as they are formed in the inboard wheel half. Referring to FIGURES 9 and 10, which show the opposite sides of the outboard wheel half, it will be noted that the ventilating openings 62a are narrower than the openings 62a formed in the inboard wheel half.

The conical shape of the outboard wheel half offers greater resistance to bending of this member by side loads and vertical loads. Since the construction is inherently more stable it is possible to reduce the necessary thickness and weight of the part. The outboard wheel half thus offers the advantages of an inherently strong structure at a minimum weight. By combining the outboard wheel half (which is structurally stable) with the inboard wheel half of larger size( or thickness) it is possible to achieve a strong wheel assembly at a minimum weight. It should also be noted that the outboard disc wheel 20a has a smaller order of vertical loads imposed thereon than does the inboard wheel half 19a, but the side loading stresses on the wheel are resisted by the conically shaped disc wheel 20a which imparts a stiffening to the wheel and thus reinforces the less stable, flatter construction of the inboard disc wheel 19a.

When assembling the wheel 10a the two wheel halves 12a and 14a are placed back-to-back with the extension 56 fitted into shoulder 68 of wheel half 14a. The two wheel halves are then rotated one with respect to the other until the valve stem openings are aligned at which position the openings 36a and 38a are matched. Bolts 40a are then passed through the matched openings 36a and 38a and nuts 41a are screwed over the bolt and tightened down to hold the two wheel halves together. The completed structure of the wheel is such that the bearing reaction forces are taken principally through disc wheel 19a of the inboard wheel half.

During side loading of the wheel, hub portions 16a and 18a of the inboard and outboard wheel halves tend to move one with respect to the other, and this movement is resisted by the cylindrical extension 58a which resists this side loading force by a shear resistance offered by the reinforcement 58a. It has been found that under actual aircraft landing conditions, the wheel provides a rigid structure and is capable of withstanding side loading forces created by landing conditions. Many wheel constructions, while providing adequate vertical support, are lacking insofar as their resistance to side loading of the wheel. With the present invention, I have found that the cylindrical reinforcement member which bridges the two hub portions of the wheel halves, is sufficient to rigidify the wheel and can successfully withstand high orders of side load which occur at one or the other of the wheel sides. Moreover, the wheel construction, while being inherently stable and resistant to vertical and side loads, has a minimum overweight and is characterized by structural simplicity.

It will be apparent from this description of the invention, that numerous modifications and revisions may be made thereof without departing from the underlying principles disclosed. It is my intention to include within the scope of the following claim those revisions and variations which are reasonably to be expected from those skilled in the art, and which incorporate the disclosed principles.

I claim:

An aircraft wheel construction comprising two forged wheel halves each having a hub portion said hub portions being axially spaced, a ribless wheel disc formed integrally with each of said hub portions, said wheel discs being conically shaped and extending into abutting relation radially outward from the axis of said wheel, means extending through the engaged portions of said wheel discs to secure the wheel halves together, a plurality of ventilating windows formed in said wheel discs to permit circulation of air through the wheel, a cylindrical extension formed on each of said wheel discs intermediate said hub and said engaged portions which extend together and are interlocked to rigidify the wheel, a circular rim segment formed transversely to said wheel discs to provide tire support, a flange on remote edges of said rim segments to laterally support the tire, and a plurality of rotor drive keys fastened to the underside of the rim portions of one of the forged wheel halves.

References Cited in the file of this patent

UNITED STATES PATENTS

| | | |
|---|---|---|
| 903,532 | Anderson | Nov. 10, 1908 |
| 1,662,944 | Werra | Mar. 20, 1928 |
| 2,048,442 | Frank | July 21, 1936 |
| 2,165,863 | Le Jeune | July 11, 1939 |
| 2,267,263 | Berger et al. | Dec. 23, 1941 |
| 2,272,962 | Tatter et al. | Feb. 10, 1942 |
| 2,367,825 | Shaw | Jan. 23, 1945 |
| 2,440,858 | Hollerith | May 4, 1948 |
| 2,566,663 | Hollerith | Sept. 4, 1951 |
| 2,580,001 | Butler | Dec. 25, 1951 |

FOREIGN PATENTS

| | | |
|---|---|---|
| 919,055 | France | Nov. 18, 1946 |